A. G. Mitchell,
Making Brush Blocks,
Nº 27,005.    Patented Jan. 31, 1860.
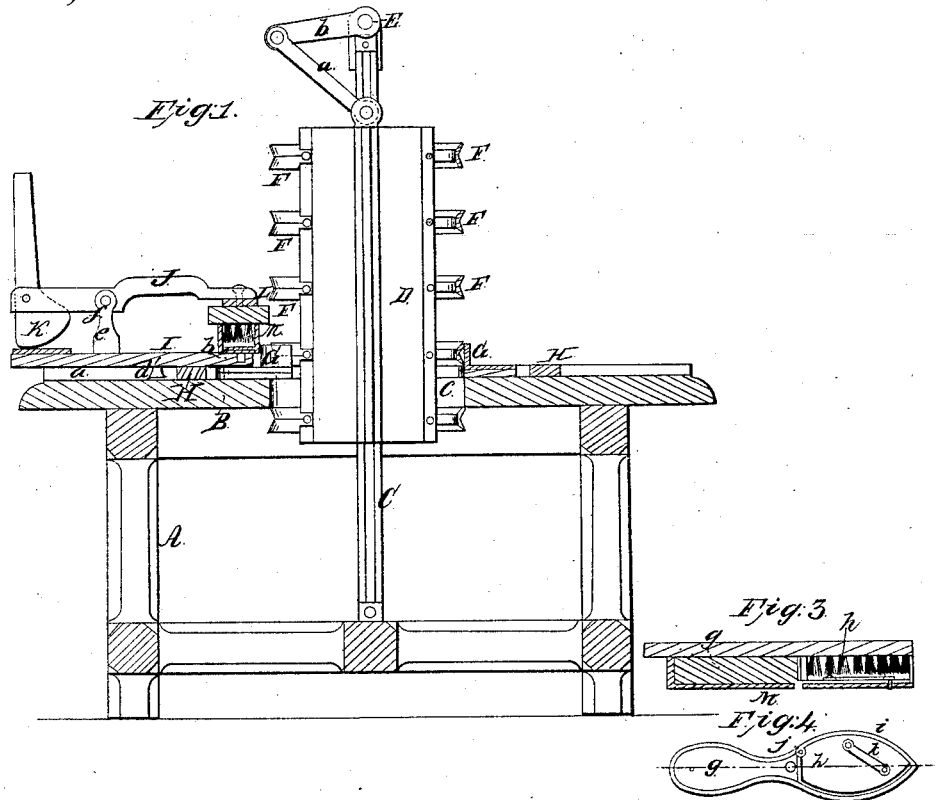
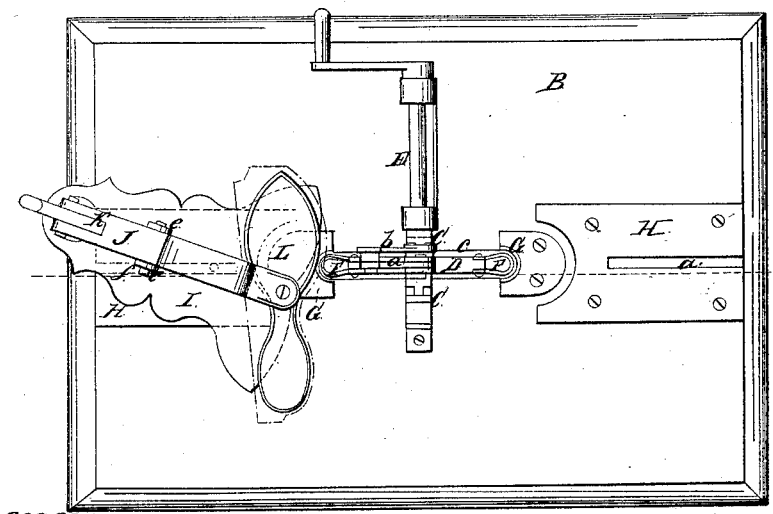
Witnesses:
John McMurray
Inventor:
A. G. Mitchell

UNITED STATES PATENT OFFICE.

A. G. MITCHELL, OF LANSINGBURG, NEW YORK.

MACHINE FOR SHAPING HAIR-BRUSH BLOCKS.

Specification of Letters Patent No. 27,005, dated January 31, 1860.

*To all whom it may concern:*

Be it known that I, A. G. MITCHELL, of Lansingburg, in the county of Rensselaer and State of New York, have invented a new and Improved Machine for Cutting out or Shaping Brush-Blocks; and I do hereby declare that the following is a full, clear, and exact description of the same, reference being had to the annexed drawings, making a part of this specification, in which—

Figure 1, is a longitudinal vertical and central section of my invention. Fig. 2, a plan or top view of the same. Fig. 3, a detached longitudinal vertical section of the pattern. Fig. 4, a detached plan or top view of the same.

Similar letters of reference indicate corresponding parts in the several figures.

This invention consists in the employment or use of a pattern in connection with guides, the pattern being so arranged that it may be rotated or turned on a center so as to admit of the shaping of the brush-block without removing the same from the pattern.

The invention also consists in the employment or use of an adjustable bed and clamp so arranged as to admit of the facile manipulation of the pattern which is attached to and centered on said bed.

The object of the invention is to expedite the cutting out or shaping of brush-blocks, both as regards the operation of the cutters and the manipulation of the work in presenting it to the action of the cutters.

To enable those skilled in the art to fully understand and construct my invention I will proceed to describe it.

A, represents a frame which supports a platform or bed B; and C, C, are two vertical guides between which a plate D, is placed and allowed to work freely up and down, the plate having a position at right angles with the guides. The upper end of the plate D, is connected by a rod $a$, with a crank $b$, of a horizontal shaft F, to the outer end of which the power is applied. To each edge of the plate D, cutters E, are attached. These cutters may be described as being of loop-form as shown in Fig. 2, and each cutter is double-edged, a cutting edge being at their upper and lower parts and the cutters project outward from their centers to their edges in both directions as shown clearly in Fig. 1, in order to form proper cutting edges, such as may be presented efficiently to their work. Any suitable number of cutters F, may be used according to the length of plate D. The plate D, works through a slot $c$, in the platform B, and to the platform B, at each end of the slot $c$, a guide G, is attached. These guides are simply curved plates attached to suitable base plates, the curvature of the plates corresponding to that of the cutters as clearly shown in Fig. 2. The cutters F, are allowed to work just free or clear of the guides G.

On the platform B, two metal plates H, H, are secured. These plates are secured to the platform B, in line with the plate D, as shown clearly in Fig. 2. The plates H, are slotted longitudinally each having a dovetail groove $d$, in which a taper guide $d'$, is fitted. These guides $d$, are attached to the under sides of beds I, and the guides secure the beds I, to the plates H, but at the same time admit of the beds turning and sliding freely on the plates H. Both plates H, H, are shown attached to the platform B, but only one bed I, is shown. This however is sufficient as both beds are precisely similar in construction.

The bed I, has two small uprights $e$, $e$, attached to its upper surface and in the upper parts of these uprights a rod or shaft $f$, is fitted which forms the fulcrum of a lever J. In the outer part of this lever a cam K, is fitted the lower end of which bears on the outer part of the bed I. To the inner end of the lever J, a plate L, is attached, said plate corresponding in form to the brush-block to be cut, as shown clearly in Fig. 2.

M, represents a pattern, which is of metal and made in the form of the brush-blocks to be cut or shaped by the machine. The pattern is also constructed with sides like a box, one part being filled with wood $g$, as shown in Fig. 3, the other part $h$, being empty and having one side $i$, connected to it by a joint $j$, so that it may be opened and closed like a door. The side $i$, is provided with a catch $k$, in order that it may be secured in a closed state when required. In the bottom of the pattern about at its center there is an aperture to receive a pin $l$, which is attached to the inner part of the bed I, and forms a center on which the pattern is allowed to turn.

The operation is as follows: The bristles of the brush are secured in the block before the latter is cut out or shaped, and the bristles are fitted in the part $h$, of the pattern as shown clearly in Fig. 3, the side $i$, being opened to admit the bristles into part $h$, and then closed. The block near its opposite end receives a spur $m$. The pattern M, with the block attached is fitted on the pin $l$, and the plate L, by means of the lever J, and cam K, is pressed firmly down on the block securing it firmly to the pattern. Motion is then given the shaft E, by any convenient power and a reciprocating motion is given the plate D. The attendant presses the pattern M, against its guide G, and moves and turns the same in contact with the guide while the cutters F, act upon the block both at their upward and downward movements and cut the same of a form corresponding to that of the pattern M. When one side of the block is cut, the pattern is turned on the bed I, so that its opposite side may be cut. By this arrangement the block does not require to be removed from the pattern nor shifted during the whole work, the pattern merely requires to be turned on the bed as described. In consequence of having the bed I, attached to the slotted plate H, by the taper pin $d'$, a free movement is allowed the bed I, to admit of the proper manipulation of the pattern.

I do not claim the guide G, separately for they have been previously used, but having thus described my invention—

What I do claim as new and desire to secure by Letters Patent, is:—

1. The pattern M, placed on a center pin $l$, and so arranged that it may turn thereon and cause both sides of the brush-block to be presented to the cutters, without changing the position of the block on the pattern or removing it therefrom.

2. The combination of the bed I, and plate H, when connected together as shown to operate as and for the purpose set forth.

A. G. MITCHELL.

Witnesses:
 JOHN MCMURRAY,
 I. RANSOM.